United States Patent
Cheon et al.

(10) Patent No.: US 7,935,436 B2
(45) Date of Patent: May 3, 2011

(54) RECHARGEABLE BATTERY WITH GAS RELEASE SAFETY VENT

(75) Inventors: Sang-Eun Cheon, Suwon-si (KR);
Jae-Kyung Kim, Suwon-si (KR);
Hye-Won Yoon, Suwon-si (KR);
Seok-Yoon Yoo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/027,949

(22) Filed: Feb. 7, 2008

(65) Prior Publication Data
US 2008/0124614 A1 May 29, 2008

Related U.S. Application Data

(62) Division of application No. 11/404,474, filed on Apr. 13, 2006.

(30) Foreign Application Priority Data

Apr. 26, 2005 (KR) .................. 10-2005-0034389

(51) Int. Cl.
*H01M 2/12* (2006.01)
*H01M 2/02* (2006.01)
*H01M 2/08* (2006.01)
*H01M 2/00* (2006.01)

(52) U.S. Cl. ........... 429/53; 429/181; 429/185; 429/163

(58) Field of Classification Search .................. 429/53, 429/57, 62, 72, 162, 163, 171, 176, 181, 429/185
See application file for complete search history.

(56) References Cited

U.S. PATENT DOCUMENTS

| | | | |
|---|---|---|---|
| 5,332,630 A | 7/1994 | Hsu | |
| 5,401,595 A | 3/1995 | Kagawa et al. | |
| 6,187,472 B1 | 2/2001 | Shiota et al. | |
| 2003/0148173 A1 | 8/2003 | Gu | |
| 2004/0038126 A1* | 2/2004 | Gu | 429/162 |
| 2006/0051658 A1 | 3/2006 | Otohata et al. | |

FOREIGN PATENT DOCUMENTS

| | | |
|---|---|---|
| CN | 2225723 Y | 4/1996 |
| CN | 1487613 | 4/2004 |
| JP | 11-097070 | 4/1999 |
| JP | 2000-285904 | 10/2000 |

(Continued)

OTHER PUBLICATIONS

"polygon." Merriam-Webster Online Dictionary. 2010. Merriam-Webster Online. Oct. 8, 2010 <http://www.merriamwebster.com/dictionary/polygon>.*

(Continued)

*Primary Examiner* — Dah-Wei D Yuan
*Assistant Examiner* — Edu E Enin-Okut
(74) *Attorney, Agent, or Firm* — Christie, Parker & Hale, LLP

(57) ABSTRACT

A rechargeable battery including an electrode assembly containing a positive electrode, a negative electrode and a separator interposed therebetween, a case having a space for housing the electrode assembly therein, lead elements connected to the electrode assembly and disposed at a sealing region of the case, and a sealant arranged between and adjacent to the case and the lead element the sealant including an area having relatively less resistance to fracture.

10 Claims, 5 Drawing Sheets

FOREIGN PATENT DOCUMENTS

| | | |
|---|---|---|
| JP | 2001-093489 | 4/2001 |
| JP | 2002-151020 | 5/2002 |
| JP | 2004-327047 | 11/2004 |
| JP | 2006-236775 | 9/2006 |
| KR | 10-2004-0110156 | 12/2004 |
| KR | 2004110156 A * | 12/2004 |
| WO | WO 2004/010517 A1 | 1/2004 |

OTHER PUBLICATIONS

U.S. Office action dated Mar. 17, 2008 for U.S. Appl. No. 11/404,474, filed Apr. 13, 2006, indicating relevance of U.S. references listed in this IDS.

Patent Abstracts of Japan for Publication No. 2000-285904; dated Oct. 13, 2000, in the name of Yoshio Aida.

Patent Abstracts of Japan for Publication No. 2004-327047; dated Nov. 18, 2004, in the name of Tsutomu Yoshinaka et al.

Korean Patent Abstracts for Publication No. 1020040110156 A; dated Dec. 31, 2004, in the name of Cheon Su Kim et al.

U.S. Office action dated Sep. 16, 2008, for U.S. Appl. No. 11/404,474, indicating relevance of reference listed in this IDS.

U.S. Office action dated Sep. 1, 2009, for U.S. Appl. No. 11/404,474, noting U.S. Patent listed in this IDS.

Japanese Office action dated Nov. 4, 2009, for related Japanese application 2006-120992, noting listed references in this IDS, 2 pgs.

* cited by examiner

RECHARGEABLE BATTERY WITH GAS RELEASE SAFETY VENT

CROSS-REFERENCE TO RELATED APPLICATION

This application is a divisional application of U.S. patent application Ser. No. 11/404,474, filed on Apr. 13, 2006 which claims priority to and the benefit of Korean Patent Application No. 10-2005-0034389 filed in the Korean Intellectual Property Office on Apr. 26, 2005, the entire content of which is incorporated herein by reference.

FIELD OF THE INVENTION

The present invention relates to a rechargeable battery having an improved safety vent for releasing gases generated in the battery.

BACKGROUND OF THE INVENTION

Unlike non-rechargeable batteries, rechargeable batteries may be recharged. Non-aqueous electrolyte rechargeable batteries with high energy density have recently been developed as high power rechargeable batteries.

Lower power batteries in which battery cells are made into a battery pack are used as a power source for various portable electronic devices such as cellular phones, laptop computers, and camcorders. Larger battery packs which are formed by connecting several to tens of rechargeable battery cells may be suitable for motor driven devices such as electric vehicles.

Rechargeable batteries may be classified into different categories based on their external shape, for example pouch-type, cylindrical, and prismatic shapes. The pouch-type case battery has been used in slim and light-weight portable electronic devices due to its flexible shape and light weight.

Unlike cylindrical or prismatic rechargeable batteries with cases that are formed of a relatively thick metal, pouch-type rechargeable batteries have a case formed of a thin metal film with insulating films attached at both sides thereof so that the battery is flexible. The pouch-type case has a space for housing the electrode assembly, and closing and sealing parts for heat-sealing along the edge of the space.

The conventional rechargeable battery may explode due to gas generation when its internal voltage increases due to overcharging. Particularly, a lithium ion battery may have increased internal pressure caused by released gas, such as carbon dioxide, carbon monoxide, and the like, when a liquid electrolyte is decomposed due to an overcharge. In addition, the battery may catch fire when the internal temperature of the battery increases due to over-current caused by an over-discharge or over-charge.

In general, a rechargeable battery can be used safely only when temperature requirements both at charge and during operation are met. However, when a temperature at battery charge or discharge, or during battery operation in machinery or equipment, is too high, the unfavorable external temperature condition may cause the battery temperature to increase, leading to explosion or combustion of the battery.

Therefore, a rechargeable battery should pass various safety tests as to high temperature storage, thermal shock, temperature storage, and the like before it is distributed for sale. These safety tests are performed by leaving the battery in various temperature conditions for various lengths of time. Batteries should not explode or catch fire to pass the tests and may be unsealed to prevent explosion or combustion in extreme situations.

There have been various attempts to make secondary batteries safer. Particularly, much attention has been paid to technology for eliminating internal gas by equipping a safety vent on a battery case. Accordingly, a can-type battery using a prismatic or cylindrical can as a battery case is mounted with a safety vent having such a structure at a cap plate or at the can itself so that the battery cannot be destroyed when the internal temperature or pressure increases. However, unlike can-type batteries, pouch-type rechargeable batteries have not been able to be mounted with a safety vent, because their case is formed of a flexible material.

SUMMARY OF THE INVENTION

An exemplary embodiment of the present invention provides a pouch-type rechargeable battery having a safety vent that can be simply manufactured and easily mounted.

According to an embodiment of the present invention, a rechargeable battery is provided that includes an electrode assembly containing a positive electrode, a negative electrode, and a separator interposed therebetween, a case having a space for housing the electrode assembly therein, lead elements connected to the electrode assembly and disposed at a sealing region of the case, and a sealant arranged between and adjacent to the case and each lead element, a portion of the sealant having a relatively weaker breaking strength.

The case may be a pouch, and the sealant may be mounted with the lead elements. The sealant may include at least one area that is thinner than the rest of the sealant. The sealant may include at least one groove. The grooves are not limited to a particular shape, but can be formed as notches. In addition, more than two grooves may be formed in opposite directions.

The sealant may have at least one reduced contact area between the case and the sealant itself. Here, the sealant may also include at least one non-contact area when it is closely adjacent to the case. The contacting area between the sealant and the case may be formed to taper toward the center of the sealant. The non-contact area may be formed to taper outward from the center of the sealant from the point where it contacts the internal or external side of the case.

The non-contact areas may be arranged to oppose each other at the area where the sealant is closely adjacent to the internal end or external end of the case.

DETAILED DESCRIPTION OF THE EMBODIMENTS

Figure 1:
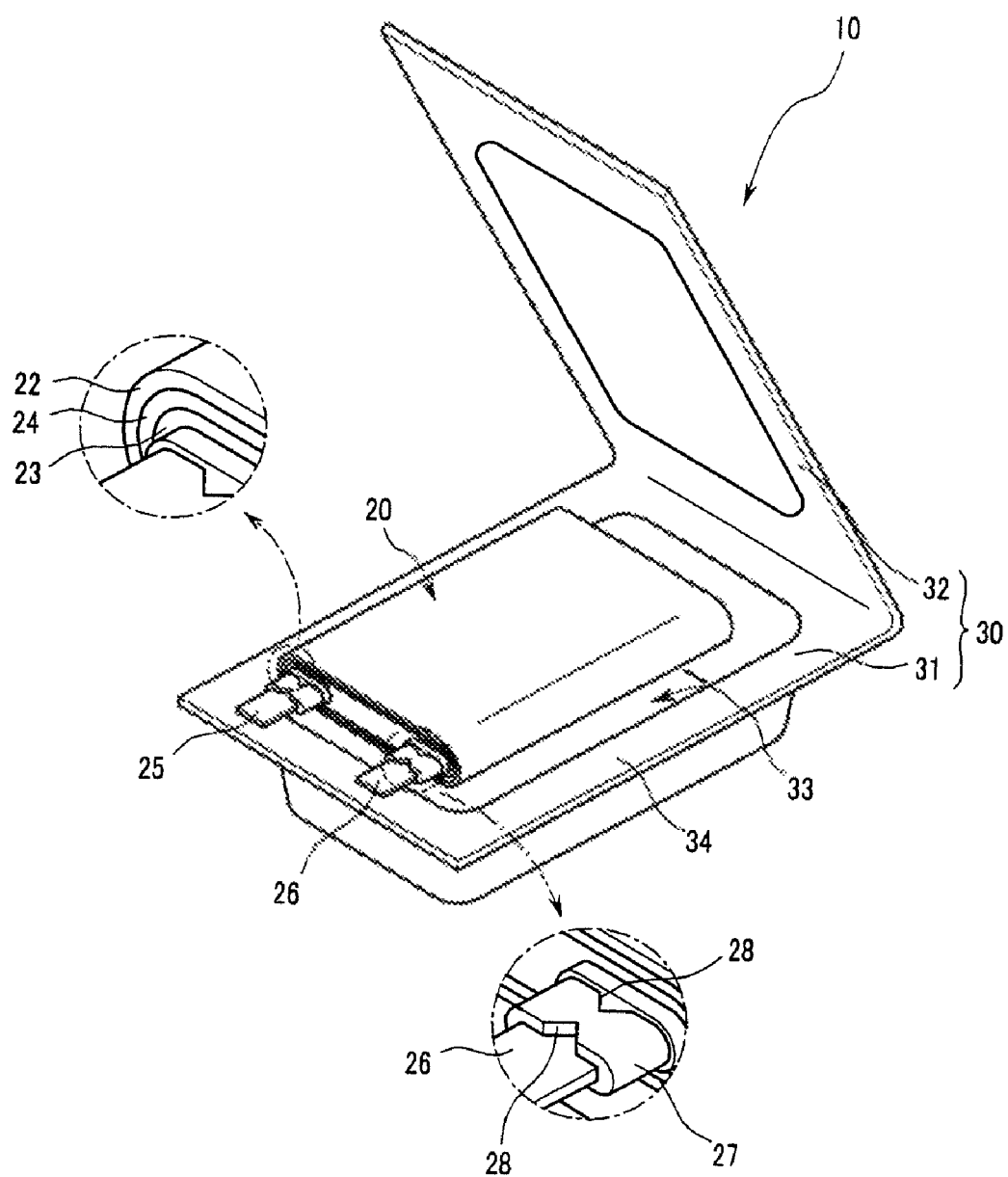
FIG. 1 is a perspective view illustrating a rechargeable battery fabricated according to an embodiment of the present invention.

As shown in FIG. 1, a pouch-type rechargeable battery 10 includes an electrode assembly 20 formed by interposing a separator 24 between a positive electrode 22 and a negative electrode 23 and then winding them together in a jelly-roll configuration, and a case 30 for housing the electrode assembly 20.

Referring to the drawing, the electrode assembly 20 is formed in a spiral-wound jelly-roll shape after interposing a separator 24 between a positive electrode 22 and a negative electrode 23, but it not limited thereto. For example, the electrode assembly may be formed as a stack by interposing a separator 24 between a positive electrode 22 and a negative electrode 23. This alternative structure may be applied to all of the following embodiments without exception.

The electrode assembly 20 includes the positive electrode 22 and the negative electrode 23 which are electrically connected to lead elements 25, 26, respectively.

The lead elements 25, 26 should be long enough to protrude from the case 30, and are arranged to be closely adjacent to a sealant 27 at an area contacting the case 30.

The sealant 27 is formed of an insulating resin and is used to prevent a short circuit between the case 30 and each lead element 25, 26, and to seal therebetween. According to an embodiment of the present embodiment, the sealant 27 may function as a safety vent, which is illustrated in detail hereafter.

Figure 2:
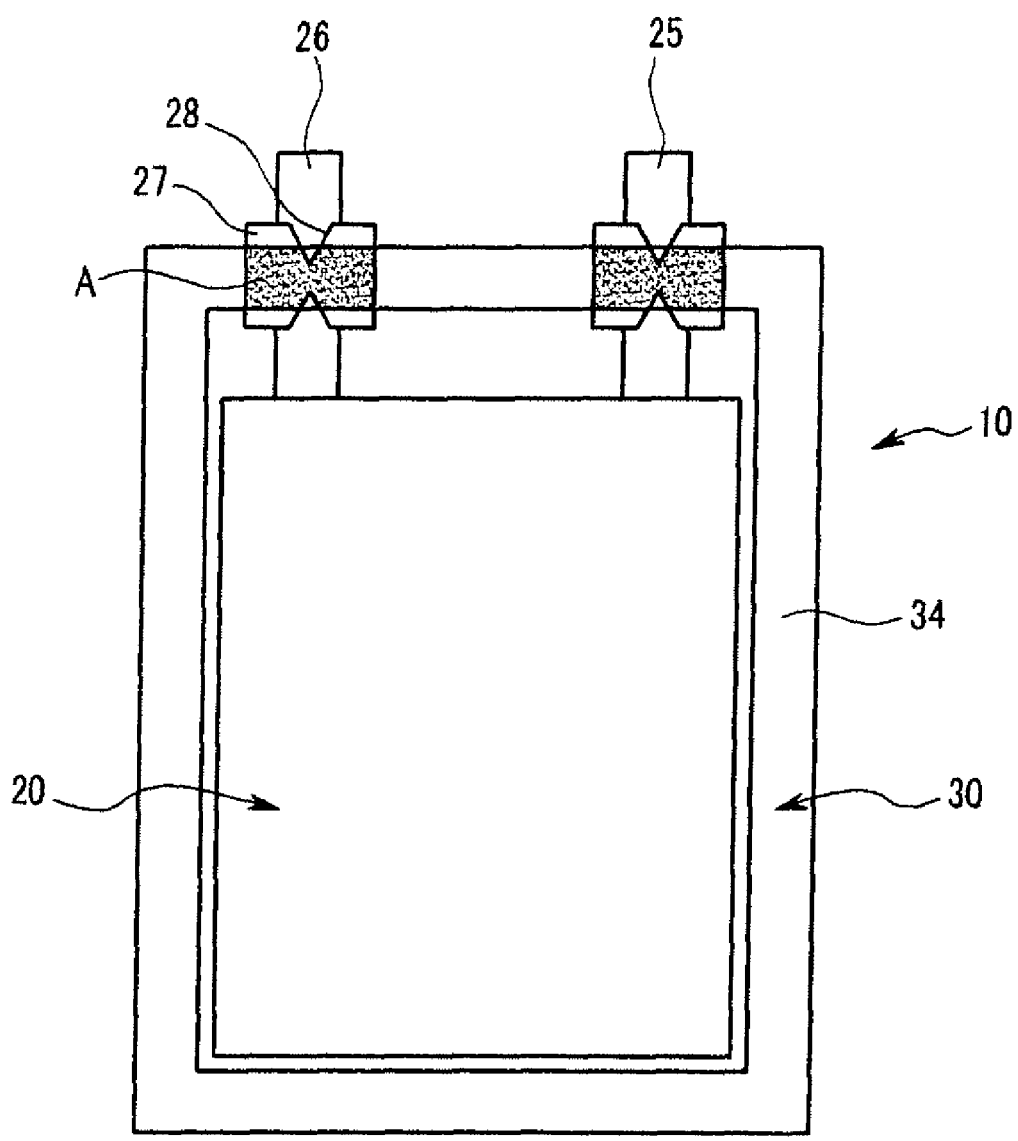
FIG. 2 is a schematic top plan view showing the assembled status of a rechargeable battery fabricated according to an embodiment of the present invention.

As illustrated in FIG. 1, the electrode assembly 20 is housed in a case 30 having a space 33. The case 30 includes a case body 31 formed with the space 33 and a cover 32 sealing the space 33. The cover 32 is formed to extend from one end of the case body 31 and to join with a flange formed around the space 33, and to form a sealing region 34 as shown in FIG. 2.

The shape of the case 30 is not limited to the aforementioned shape, but may also be formed as a pouch with an opening at one end for housing an electrode assembly and being sealed, even though this is not illustrated.

The case 30 may be formed of a thin plate having a mixture of a metal and a resin. The thin plate is formed of a composite made by including an internal thermal adhesive layer comprising a polymer resin, for example, modified polypropylene and the like, and an exterior resin such as nylon or polyethylene terephthalate, and then pressing them together.

Accordingly, the case 30 may be sealed by hot-pressure when the thermal adhesive layers of the case body 31 and the cover 32 are positioned to face each other.

The case 30 is sealed by forming a sealing region 34 along a flange of the case body 31. The sealing region is formed by thermally bonding the case body 31 with the cover 32 after the electrode assembly 20 is inserted into the case 30. The sealing region 34 has two lead elements 25, 26 protruding therefrom, and connected with a positive electrode 22 and a negative electrode 23 of the electrode assembly 20. The sealant 27 attached to each lead element 25, 26 is positioned to contact a part of the sealing region 34. The sealant 27 joins with the sealing region 34 of the case 30, maintaining air-tightness between the case 30 and the lead elements 25, 26 when the case is not pressure sealed.

As illustrated in FIG. 2, the sealant 27 may be mounted in such a way that two ends of the sealant are outwardly exposed from the sealing region 34 in the lengthwise direction of the lead elements 25, 26. Otherwise, the two ends of the sealant 27 would not be long enough to extend from the sealing region 34.

According to an embodiment of the present invention, the sealant 27 may include at least one area contacting the case 30, such as area "A," with less resistance to fracture than the rest of the sealing region 34. The area with less resistance to fracture may act as a safety vent which ruptures to secure battery safety when the internal pressure of the battery increases.

The area with less resistance to fracture may be formed by regulating the thickness of the sealant 27 or the area where the sealant 27 is adjacent to the case 30.

According to one embodiment of the present invention, the sealant 27 may have at least one groove toward the center of the case 30 in a contacting area "A," where the sealant 27 forms part of the sealing region 34 with the case 30.

The sealant 27 has less surface area contact with the case 30 at the groove less than at the other areas, and accordingly it has less resistance to fracture at the groove. When the internal pressure of a battery increases, the area ruptures to release gas inside the case 30. Here, the sealant 27 may have various rupture pressures depending on the depth of the groove, but the depth of the groove has no particular limit.

The sealant 27 can include two substantially identical grooves opposing each other at the internal and external adhesive sides of the case 30.

The groove has no particular limit to its shape, but it may be formed as a notch 28. The notch 28 denotes a place where the width of the sealant 27 sharply decreases in a lengthwise direction of the lead elements 25, 26. According to the embodiment of the present invention, the notch 28 may be shaped as a letter "V" with its tip pointing toward the center of the sealant.

As shown in FIG. 2, the sealant 27 has a notch 28 at the contacting area "A" with the case 30, where the sealant forms part of the sealing region 34, and so has a width that is reduced by the notch 28. Accordingly the sealant 27 has less resistance to fracture at the notch 28 than the other areas.

When the rechargeable battery 10 mounted with a sealant 27 having the notch 28 internally produces gas due to overcharge/over-discharge or high temperature usage, thus increasing the internal pressure of the battery, the case 30 expands. The sealant 27 then ruptures at the notch 28 due to concentrated stresses as the internal pressure increases. Internal gas of the battery is then released through the ruptured notch 28, preventing explosion or combustion of the battery.

Figure 3:
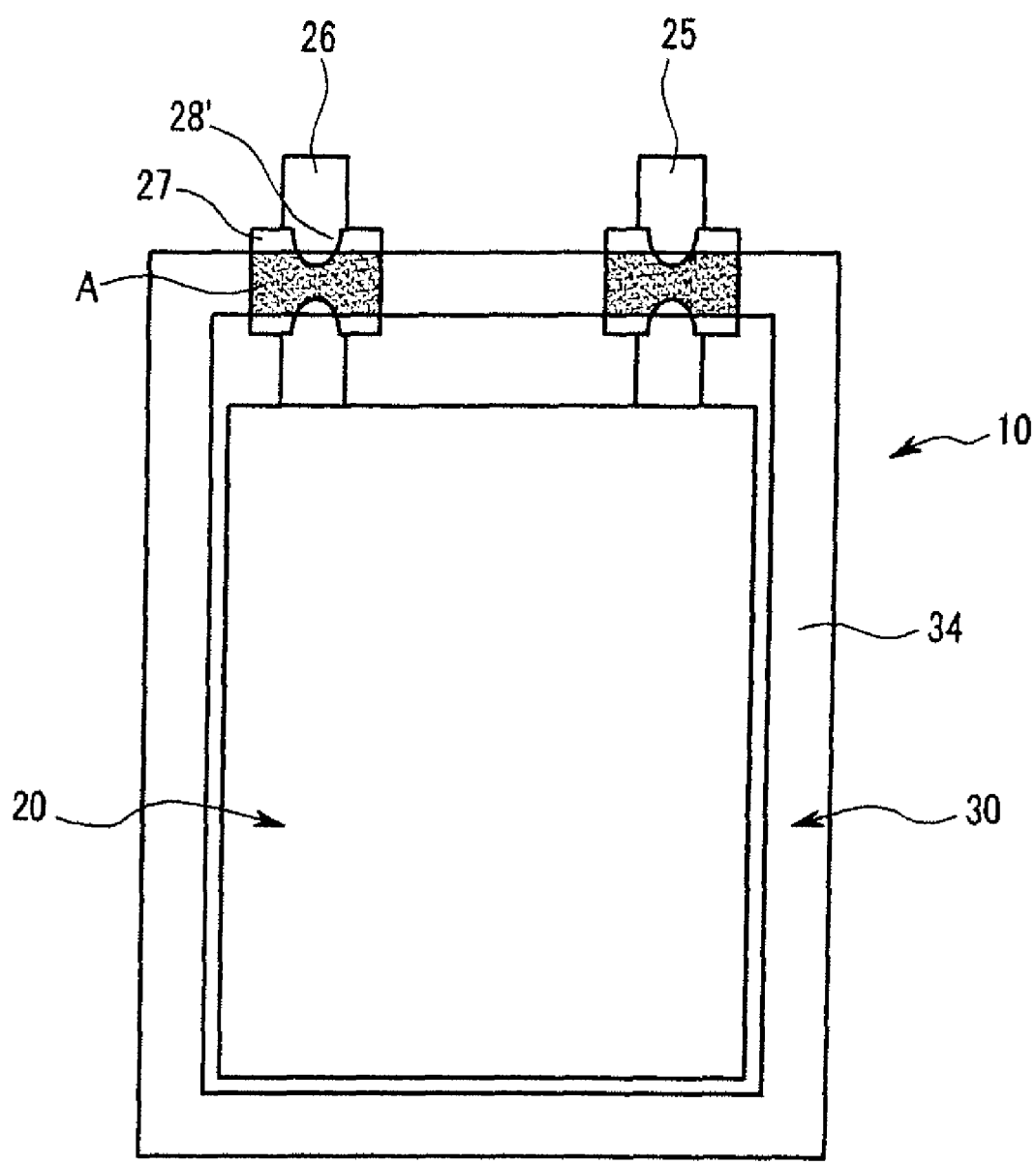
FIG. 3 is a schematic top plan view showing the assembled status of a rechargeable battery fabricated according to another embodiment of the present invention.

According to another embodiment of the present invention, the groove may be formed as a circular arc 28' as shown in FIG. 3. In FIG. 3, the same members that are the same as members in FIG. 2 are assigned the same reference numerals as in FIG. 2.

Figure 4:
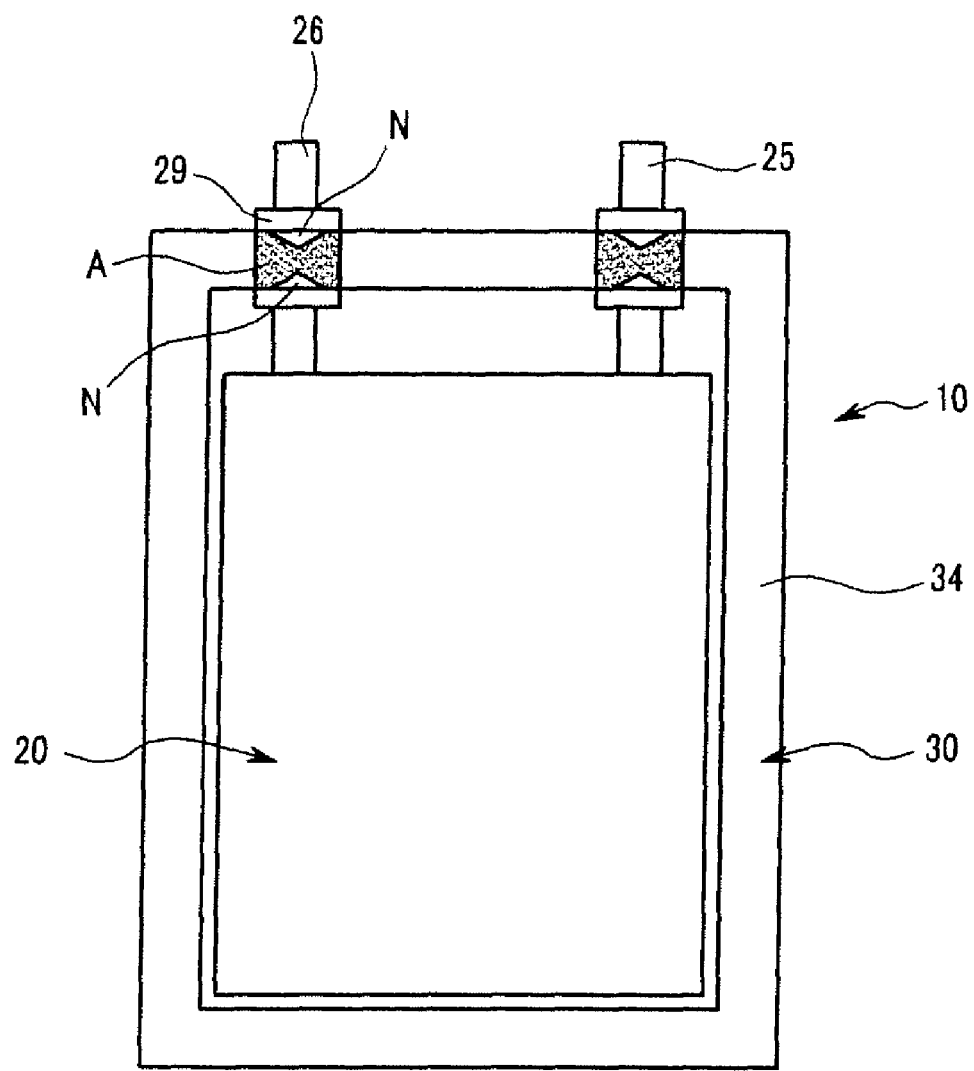
FIG. 4 is a schematic top plan view showing a rechargeable battery fabricated according to another embodiment of the present invention.

FIG. 4 schematically shows a rechargeable battery 10 fabricated according to another embodiment of the present invention. The rechargeable battery 10 includes an electrode assembly 20 having a positive electrode and a negative electrode with a separator interposed therebetween, lead elements 25, 26 electrically connected with the positive and negative electrodes, respectively, a case 30 having a space for housing the electrode assembly 20, comparable to that previously described with respect to FIG. 1. The case 30 is sealed with the lead elements 25, 26 outwardly exposed, and a sealant 29 ensures that the lead elements 25, 26 are adjacent to the case 30. The sealant 29 may include at least one non-contact area "N" at the contacting area "A" with the case 30. As illustrated in FIG. 4, the non-contact area "N" is formed at the inner side or the outer side of the case 30.

The non-contact area "N" is formed between the sealant 29 and the sealing region 34 of the case 30. The non-contact area "N" may be formed as a notch toward the center of the sealant 29 at the internal side of the case 30. The notch-type non-contact area "N" may have a "V" shape.

In addition, the non-contact areas "N" may be formed toward the center of the sealant 29 from the internal and external sides of the case 30. They may face each other and have substantially the same size.

Since the sealant 29 has less contact area with the case 30 than the rest of the sealing region 34 due to the non-contact area "N," it may rupture due to concentrated stresses at the non-contact areas "N" caused by increased internal pressure of the battery.

The sealant 29 may have various rupture pressures depending on the non-contact areas "N" formed therein, but there is no particular limit to the area thereof.

The non-contact area "N" may be formed at the contacting area "A" between the sealant 29 and the sealing region 34 of the case 30. For example, after fabricating a press that hot-presses the sealant 29 and the sealing region 34 of the case to form a groove shape corresponding to the non-contact area "N", the non-contact area "N" may be formed as a groove shape where the sealant is not closely adjacent to the case 30. Of course, the non-contact area may be formed in various ways other than the above example, according to the general scope of the present invention.

The present invention provides improved sealants 27, 29 mounted with lead elements 25, 26, allowing the sealants 27, 29 to work as safety vents to release internal gas inside a battery when it is over-pressurized.

The rechargeable battery may be used as an energy source for driving a motor for a hybrid electric vehicle (HEV), an electric vehicle (EV), a cordless cleaner, a motorbike, an electric scooter, and the like as well as small-sized electrical equipment.

Figure 5:
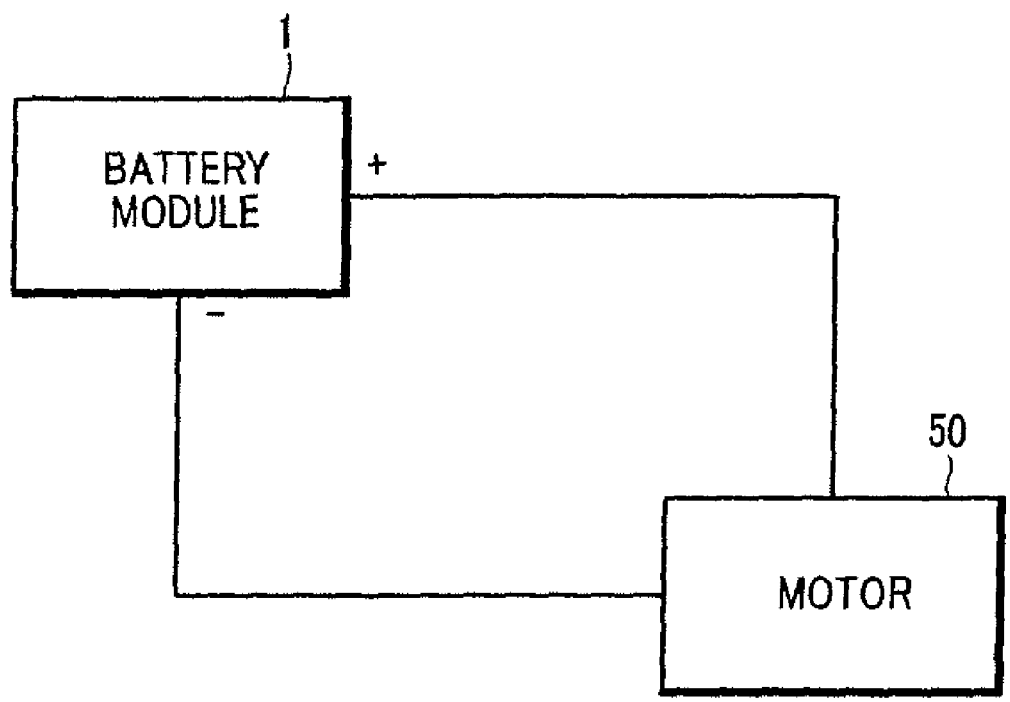
FIG. 5 is a schematic block diagram showing a rechargeable battery driving a motor according to an embodiment of the present invention.

A plurality of the above-mentioned rechargeable batteries are connected to each other in series or in parallel to provide a battery module. FIG. 5 is a schematic block diagram of a battery module 1 which includes the rechargeable batteries as discussed in FIGS. 1 to 4 for driving a motor 50.

In this way, a rechargeable battery fabricated according to the present invention can prevent thermal runaway or combustion and explosion by appropriately releasing internal gas, thereby securing safety and reliability.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A rechargeable battery comprising:
    an electrode assembly having a plurality of protruding electrodes;
    a case having an upper portion and a lower portion, the lower portion having a space for mounting the electrode assembly, the case having a sealing region at the periphery of and between each of the upper portion and the lower portion; and
    a sealant directly on a respective protruding electrode of the plurality of protruding electrodes at the sealing region, the sealant comprising a fracture area configured to rupture when the upper portion and the lower portion are sealed at the sealing region and when internal pressure within the battery reaches a predetermined rupture pressure, wherein the fracture area comprises a groove tapering toward the interior of the sealant, the sealant further comprising a non-fracture area, and
    wherein the groove comprises a plurality of grooves tapering toward the interior of the sealant from an internal or external side of the case.

2. The rechargeable battery of claim 1, wherein the case is a pouch.

3. The rechargeable battery of claim 1, wherein the groove comprises a notch.

4. The rechargeable battery of claim 1, wherein the groove is defined by the case, the respective protruding electrode, and a notch in the sealant.

5. A rechargeable battery comprising:
    an electrode assembly having a plurality of protruding electrodes;
    a case having an upper portion and a lower portion, the lower portion having a space for mounting the electrode assembly, the case having a sealing region at the periphery of and between each of the upper portion and the lower portion; and
    a sealant on a respective protruding electrode of the plurality of protruding electrodes at the sealing region, the sealant comprising a fracture area configured to rupture when the upper portion and the lower portion are sealed at the sealing region and when internal pressure within the battery reaches a predetermined rupture pressure, wherein the fracture area comprises a groove tapering toward the interior of the sealant, the groove being defined by the case, and the respective protruding electrode, and a notch in the sealant, the sealant further comprising a non-fracture area, and
    wherein the groove comprises a plurality of grooves tapering toward the interior of the sealant from an internal or external side of the case.

6. The rechargeable battery of claim 1, wherein the fracture area comprises a groove tapering toward the interior of the sealant from an internal side of the case.

7. The rechargeable battery of claim 1, wherein the fracture area comprises a groove tapering toward the interior of the sealant from an external side of the case.

8. The rechargeable battery of claim 1, wherein the fracture area is polygon shaped.

9. The rechargeable battery of claim 8, wherein the polygon shape is triangular.

10. The rechargeable battery of claim 1, wherein the fracture area is semicircular.

* * * * *